May 26, 1959 — A. R. CHASAR ET AL — 2,887,886
PORTABLE POWER UNIT
Filed March 18, 1955 — 2 Sheets-Sheet 1
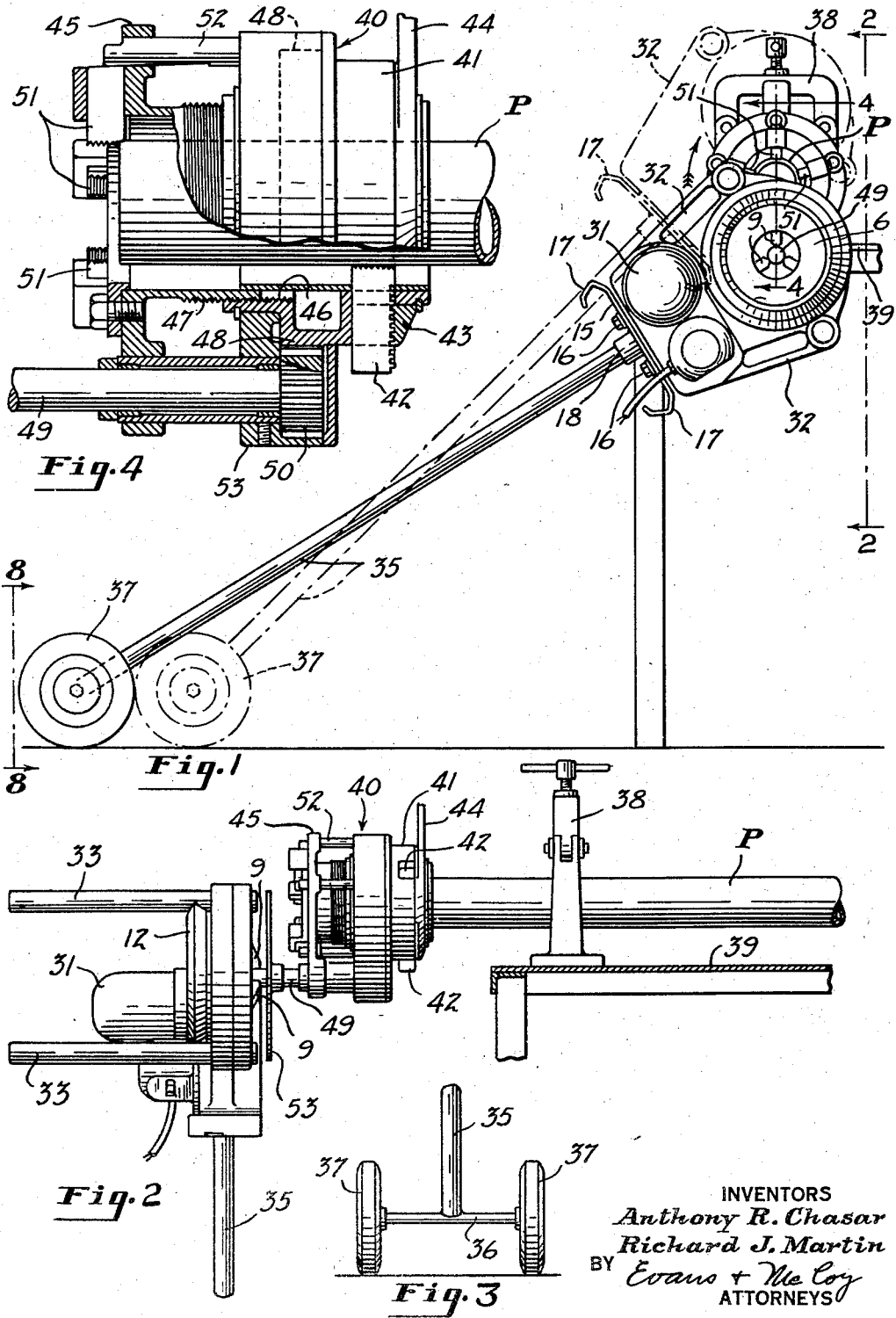
INVENTORS
Anthony R. Chasar
Richard J. Martin
BY Evans + McCoy
ATTORNEYS May 26, 1959 A. R. CHASAR ET AL 2,887,886
PORTABLE POWER UNIT
Filed March 18, 1955 2 Sheets-Sheet 2

INVENTORS
Anthony R. Chasar
Richard J. Martin
BY Evans + McCoy
ATTORNEYS

United States Patent Office
2,887,886
Patented May 26, 1959

2,887,886

PORTABLE POWER UNIT

Anthony R. Chasar, Cleveland, and Richard J. Martin, Cleveland Heights, Ohio, assignors to The Oster Manufacturing Company, Cleveland, Ohio, a corporation of Ohio Application March 18, 1955, Serial No. 495,124

3 Claims. (Cl. 74—16)

This invention relates to a portable power unit having a power driven manually controlled chuck that is adapted to grip and rotate the planetary drive shaft of a pipe threading die or other bench supported mechanism having a planetary drive shaft and that also includes a floor engaging supporting member that permits the chuck to move orbitally with the planetary shaft but that holds the chuck against rotation with the shaft that it drives.

The auxiliary floor support is preferably in the form of a detachable supporting leg provided with supporting wheels which permit the floor engaging end of the supporting leg to travel freely back and forth on the floor surface during the orbital movement of the planetary shaft and power unit. The wheel supporting leg may also be used as a convenient means of transportation for the unit by detaching the leg and inserting it through the chuck and clamping the unit to the leg by means of the chuck jaws.

Reference should be had to the accompanying drawings forming a part of this specification, in which:

Fig. 1 is a rear elevation showing the power driven chuck attached to the planetary shaft of a receding threading die, with the floor engaging supporting leg attached to the chuck housing;

Fig. 2 is a fragmentary side elevation of the assembly shown in Fig. 1 viewed as indicated at 2—2 in Fig. 1;

Fig. 3 is a side elevation of the leg supporting wheels;

Fig. 4 shows the receding threading die partly in side elevation and partly in axial section, on the line indicated at 4—4 in Fig. 1;

Figures 5, 6:
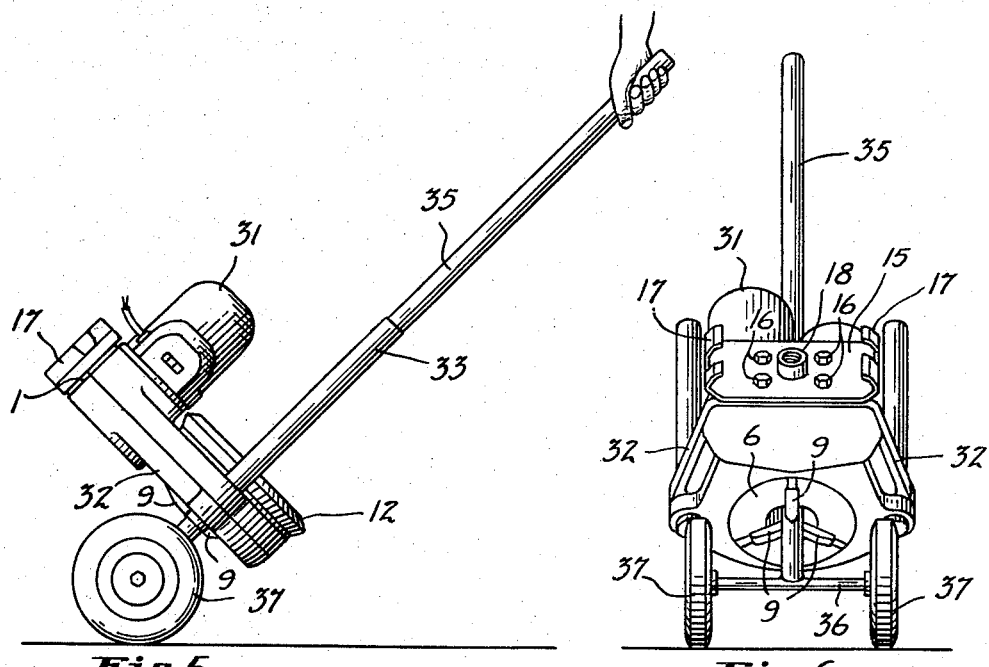
Fig. 5 is a side elevation showing the power unit mounted for transportation on a wheel supporting leg.
Fig. 6 is a front elevation of the assembly shown in Fig. 5.

Referring to the accompanying drawings, the power driven chuck is mounted in a housing having an elongated flat base 1 and closely spaced upright front and rear walls 2 and 3. The walls 2 and 3 have inturned marginal flanges that abut to form the opposite side walls and the top wall of the housing. Adjacent the top of the housing the front and rear walls 2 and 3 have alined openings with internally cylindrical flanges 4 and 5 at the margins thereof, in which a spindle or chuck body 6 is journaled. The chuck body 6 has a cylindrical outer wall portion 7 that is journaled in the front and rear walls of the housing, a metal bearing ring 8 being imposed between the cylindrical wall 7 and each of the flanges 4 and 5.

Angularly spaced radially movable clamping jaws 9 are mounted in the chuck body 6 adjacent the front end thereof and these jaws are simultaneously moved inwardly or outwardly by means of a cam, which as herein shown, is in the form of a scroll wheel 10 that is rotatably mounted upon an inner cylindrical wall portion 11 of the chuck body 6. The inner wall portion 11 is concentric with the outer cylindrical wall portion 7 and spaced radially inwardly therefrom to provide an annular chamber in which the scroll wheel 10 is mounted.

For actuating the scroll wheel 10 to clamp or release the clamping jaws 9, a handwheel 12 is rotatably mounted on the cylindrical wall portion 11 of the chuck body inwardly of the scroll wheel 10. The handwheel 12 is rotatable with respect to both the chuck body and the scroll wheel and has a lost motion impact driving connection with the scroll wheel. The handwheel 12 has forwardly projecting driving lugs 13 which are spaced circumferentially and which extend into the space between angularly spaced rearwardly projecting lugs 14 and the scroll wheel 10. By means of the handwheel 12 the scroll wheel can be turned in either direction on the chuck body to tighten or loosen the clamping jaws and the lost motion between the lugs 13 and 14 enables the handwheel to exert a hammer-like impact on the scroll wheel to tighten or loosen the clamping jaws.

An elongated rectangular attaching plate 15, which conforms substantially to the bottom wall 1 of the chuck housing, is secured to the bottom wall by means of bolts 16 and is provided with outturned end flanges 17 and with a central socket 18 that is adapted to receive a supporting member.

Figure 7:
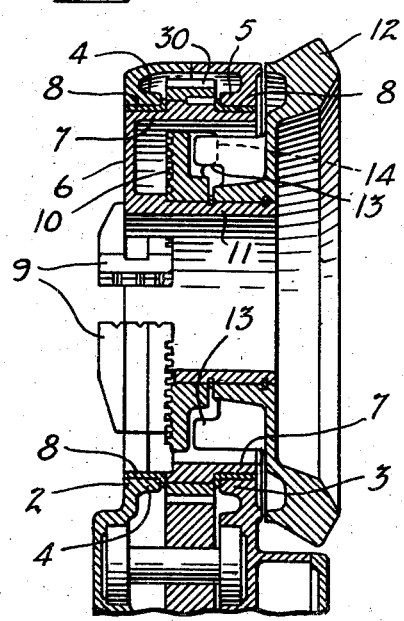
Fig. 7 is a central vertical section through the chuck.

As shown in Fig. 7, the outer cylindrical wall portion 7 of the chuck body carries a centrally disposed external gear 30 by means of which the chuck body is driven through the reduction gearing in the bottom portion of the chuck housing. The chuck is preferably driven by a reversible electric motor 31 attached to the bottom portion of the rear wall of the chuck housing. The chuck housing is provided with handgrips 32 on opposite sides thereof to facilitate lifting.

In Figs. 1 and 2 the power unit is shown employed as a driver for a pipe threading die, the chuck being clamped to the drive shaft of the die and having a supporting leg 35 secured in the socket 18 of the attaching plate 15. The supporting leg 35 and socket 18 have screw threaded connections and the leg 35 has a transverse axle 36 attached to its lower end and, the axle 36 which extends on opposite sides of the leg 35, carries supporting wheels 37 at its ends which rest on the floor.

As shown in Fig. 2, a pipe P of large diameter is clamped in a suitable vise 38 on a supporting bench 39 and a receding die head 40 is mounted on the end thereof which projects past the bench 39. The die head 40 has an inner portion 41 that is rigidly clamped to the pipe P by means of radially movable jaws 42 that can be moved simultaneously into and out of clamping engagement with the pipe by means of a scroll wheel 43 that is adapted to be turned by means of a handle 44, the scroll wheel 43 being rotatably mounted on the inner portion 41 of the die head. The inner portion 41 of the die head provides a support for a receding die carrier 45, being provided with a cylindrical internally threaded portion 46 into which the externally threaded cylindrical body portion 47 of the carrier 45 is screwed. The fixed inner portion 41 of the die head has an external gear 48 and the die carrier 45 carries an axially extending shaft 49 which has a gear 50 that meshes with the external gear 48. When the shaft 49 is rotated a gear 50 is caused to travel around the stationary gear 48 and rotate the carrier 45 about its axis. The die carrier has threading dies 51 attached to its outer end which engage with the pipe P to thread the same when the die carrier 45 is rotated and moved inwardly.

By clamping the power driven chuck body 6 to the shaft 49, the shaft may be driven by means of the motor 31, the housing supporting the chuck and motor being held against rotation with the shaft 49 by means of the supporting leg 35. During orbital movement of the power unit with the shaft 49, the supporting wheels 37 roll back and forth on the floor. Guide pins 52 carried by an annulus 53 rotatable on the die head 40 and providing a bearing for the shaft 49 adjacent the gear 50 extend axially through portions of the die carrier 45 to rigidly support the die carrier during the threading operation. A guard disk 53 may be provided on the shaft 49 to prevent movement of the pins 33 to a position where they might engage with portions of the die head.

For moving the power unit from place to place the supporting leg 35 can be conveniently used as a sort of two wheel hand truck by inserting the leg through the chuck opening and moving the clamping jaws into clamping engagement with the supporting leg as shown in Fig. 5. With the housing secured to the supporting leg as shown in Fig. 5, the supporting stand and other accessories can be supported on the housing for transportation.

It is to be understood that in accordance with the provisions of the patent statutes, variations and modifications of the specific devices herein shown and described may be made without departing from the spirit of the invention.

What we claim is:

1. A portable power unit for driving a bench supported mechanism having a planetary drive shaft comprising a housing having front and rear walls with alined openings and a bottom provided with a downwardly opening socket, a chuck journaled in said housing to rotate about an axis transverse to that of said socket and having radially movable shaft clamping jaws, chuck driving means including a motor attached to the rear wall of said housing, means carried by said housing for actuating said chuck jaws to clamp a shaft extending through one of said openings, and means for supporting said unit for orbital movement with a shaft clamped by said chuck and for holding said unit against turning movement with said shaft comprising an elongated supporting leg having an upper end that is detachably secured in said socket, a transversely disposed axle attached to the lower end of said leg and projecting on opposite sides thereof and a floor engaging supporting wheel on each end of said axle.

2. The combination with a bench supported pipe threader having pipe clamping means and a driving shaft which has planetary movement about the pipe axis, of a portable power unit comprising a housing having front and rear walls with alined openings and a bottom plate provided with a central internally threaded socket, a chuck carrying radially movable clamping jaws adapted to grip said shaft and mounted in said housing to rotate about an axis transverse to that of the socket, chuck driving means including a motor attached to the rear of said housing, manually operable jaw actuating means carried by said housing, and means for supporting said unit for orbital movement with said shaft and for holding said unit against turning movement with said shaft comprising an elongated supporting leg having a threaded upper end screwed into said socket and a floor engaging supporting wheel secured to the lower end of said leg.

3. The combination with a bench supported mechanism having a planetary drive shaft, of a portable power unit comprising a housing having closely spaced upright front and rear walls provided on the upper portions thereof with alined openings, a chuck body having a cylindrical outer wall journaled in said openings and a cylindrical inner wall spaced radially inwardly from said outer wall and providing an annular chamber in said body, radially movable clamping jaws mounted in said chuck body adjacent the front of the housing for gripping engagement with said shaft, a jaw actuating cam mounted in said chamber inwardly of said jaws, a cam actuating handwheel rotatably mounted on said inner wall rearwardly of said cam, means comprising a reversible electric motor attached to the bottom portion of the rear wall of the housing and including reduction gearing in the housing beneath the chuck body for driving said chuck body, and means for supporting said unit for orbital movement with said shaft and for holding said unit against turning movement with said shaft comprising an elongated floor engaging supporting leg rigidly and detachably secured at its upper end to the bottom of said housing.

UNITED STATES PATENTS

References Cited in the file of this patent

| | | |
|---|---|---|
| 1,344,280 | Vosper | June 22, 1920 |
| 1,674,669 | Stedman | June 26, 1928 |
| 2,097,729 | Mall | Nov. 2, 1937 |
| 2,213,379 | Bird et al. | Sept. 3, 1940 |
| 2,332,114 | Robb | Oct. 19, 1943 |
| 2,368,731 | Snyder et al. | Feb. 6, 1945 |
| 2,463,266 | Habenicht | Mar. 1, 1949 |
| 2,567,128 | Shoffner | Sept. 4, 1951 |